US012746670B2

(12) United States Patent
Zeng et al.

(10) Patent No.: US 12,746,670 B2
(45) Date of Patent: Sep. 29, 2026

(54) MASSAGE MOTION CONTROL METHOD, ROBOT CONTROLLER USING THE SAME, AND COMPUTER READABLE STORAGE MEDIUM

(71) Applicant: UBTECH ROBOTICS CORP LTD, Shenzhen (CN)

(72) Inventors: Xianwen Zeng, Shenzhen (CN); Yizhang Liu, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 1226 days.

(21) Appl. No.: 17/702,769

(22) Filed: Mar. 23, 2022

(65) Prior Publication Data

US 2022/0379469 A1 Dec. 1, 2022

Related U.S. Application Data

(63) Continuation of application No. PCT/CN2021/131894, filed on Nov. 19, 2021.

(30) Foreign Application Priority Data

May 26, 2021 (CN) ......................... 202110577585.3

(51) Int. Cl.
*B25J 9/16* (2006.01)
*A61H 7/00* (2006.01)

(52) U.S. Cl.
CPC ............ *B25J 9/1664* (2013.01); *A61H 7/001* (2013.01); *A61H 2201/018* (2013.01); *A61H 2201/1659* (2013.01); *A61H 2201/5007* (2013.01)

(58) Field of Classification Search
CPC ........ A61H 7/001; A61H 7/002; A61H 7/004; A61H 15/0078; A61H 2201/018
See application file for complete search history.

(56) References Cited

U.S. PATENT DOCUMENTS

2020/0121556 A1* 4/2020 Tian ....................... A61H 39/02
2021/0154852 A1* 5/2021 Eyssautier ........... G05B 19/401
2022/0134551 A1* 5/2022 Litman .................. B25J 9/1633
700/260

FOREIGN PATENT DOCUMENTS

CN 110421560 A 11/2019

* cited by examiner

*Primary Examiner* — Paige Kathleen Bugg
*Assistant Examiner* — Brian T Khong

(57) ABSTRACT

A massage motion control method, a robot controller using the same, and a storage medium are provided. The method includes: calculating a robot end desired speed and a robot end desired angular speed corresponding to a desired massage trajectory of a massage robot to compensate using two obtained robot end compensation amounts in the case that the desired massage trajectory for a target massage area at a current control cycle, a robot end speed compensation amount meeting a desired massage intensity requirement, and a robot end angular speed compensation amount adapted to an environmental curvature of the target massage area are obtained, and controlling the massage robot by determining a corresponding to-be-outputted joint angle based on motion parameter(s) obtained by the compensation. In this manner, the adaptive change of the massage position and the massage intensity for the massage area of the patient can be realized.

20 Claims, 10 Drawing Sheets

MASSAGE MOTION CONTROL METHOD, ROBOT CONTROLLER USING THE SAME, AND COMPUTER READABLE STORAGE MEDIUM

CROSS-REFERENCE TO RELATED APPLICATIONS

The present disclosure is a continuation-application of International Application PCT/CN2021/131894, with an international filing date of Nov. 19, 2021, which claims foreign priority of Chinese Patent Application No. 202110577585.3, filed on May 26, 2021 in the State Intellectual Property Office of China, the contents of all of which are hereby incorporated by reference.

BACKGROUND

1. Technical Field

The present disclosure relates to robot control technology, and particularly to a massage motion control method, a robot controller using the same, and a storage medium.

2. Description of Related Art

With the continuous development of science and technology, robot technology has received extensive attention from all walks of life because of its great values in research and application. In which, the control service robots to perform massage physiotherapy on the human body is an important topic for the research of robot control technology. In the process of a robot performing the massage motion, the position and the intensity of the massage performed by the robot are important factors that affect the patient's experience. Therefore, there's a necessary to provide a massage motion control method capable of performing the massage motion with suitable position and intensity simultaneously.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
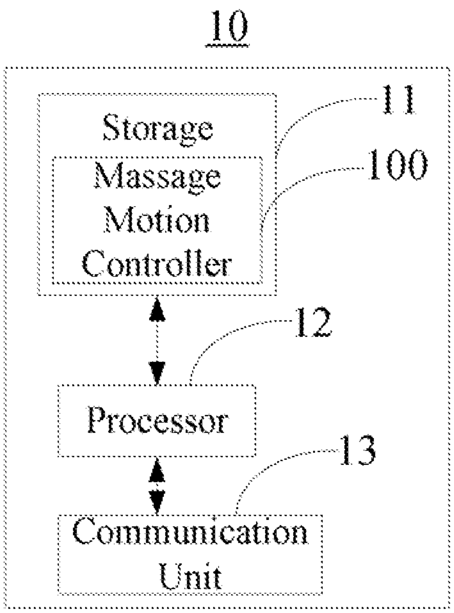
FIG. 1 is a schematic block diagram of the composition of a robot controller according to an embodiment of the present disclosure.

In order to make the objects, technical solutions and advantages of the embodiments of the present disclosure more clear, the technical solutions in the embodiments of the present disclosure will be clearly and completely described below with reference to the drawings in the embodiments of the present disclosure. Apparently, the described embodiments are part of the embodiments of the present disclosure, not all of the embodiments. The components of the embodiments of the present disclosure that are described and illustrated in the drawings herein may generally be arranged and designed in a variety of different configurations.

Therefore, the following detailed description of the embodiments of the present disclosure provided in the drawings is not intended to limit the scope of the present disclosure, but merely represent the selected embodiments of the present disclosure. Based on the embodiments in the present disclosure, all other embodiments obtained by those of ordinary skill in the art without creative work fall within the protection scope of the present disclosure.

It should be noted that, in the following figures, similar numerals and letters refer to similar items. Therefore, once an item is defined in one figure, it does not require further definition and explanation in subsequent figures.

In the description of the present disclosure, it is to be understood that relational terms such as "first" and "second" are used only to distinguish one entity or operation from another entity or operation, and do not necessarily require or imply the existence of any actual relationship or sequence between these entities or operations. Moreover, the terms "comprising", "including" or any other variation thereof are intended to encompass non-exclusive inclusion such that a process, method, article or apparatus (device) comprising a series of elements includes not only those elements, but also includes other elements not explicitly listed or inherent to the process, method, article or apparatus. Without further limitation, an element limited by the sentence "comprising a . . . " does not preclude the existence of additional identical elements in a process, method, article or apparatus that includes the element. For those of ordinary skill in the art, the specific meanings of the above-mentioned terms in the present disclosure can be understood according to the specific condition.

Some embodiments of the present disclosure will be described in detail below with reference to the drawings. The following embodiments and the features therein may be combined with each other while there is no confliction therebetween.

FIG. 1 is a schematic block diagram of the composition of a robot controller 10 according to an embodiment of the present disclosure. As shown in FIG. 1, in this embodiment, the robot controller 10 is used to effectively control the massage motion of (a humanoid mechanical arm of) a massage robot (see FIG. 2), so that the massage motion exerted on the body of a patient can effectively fit the massage area of the patient and achieve the desired massage effect, thereby improving the patient's massage experience. In which, the robot controller 10 may be connected with the massage robot by remote communication, or be integrated with the massage robot, so as to adaptively change the massage position and the massage intensity of the robot for the patient's massage area during controlling the massage robot to move, so that the corresponding massage motion is adapted to the patient's massage area. In this process, the massage robot controlled by the robot controller 10 usually needs to have the humanoid robotic arm (see FIG. 2) to realize its massage physiotherapy functions, where the humanoid robotic arm may be, but is not limited to, a robotic arm with six degrees of freedom (DOF), a robotic arm with seven degrees of freedom, or the like.

Figure 2:
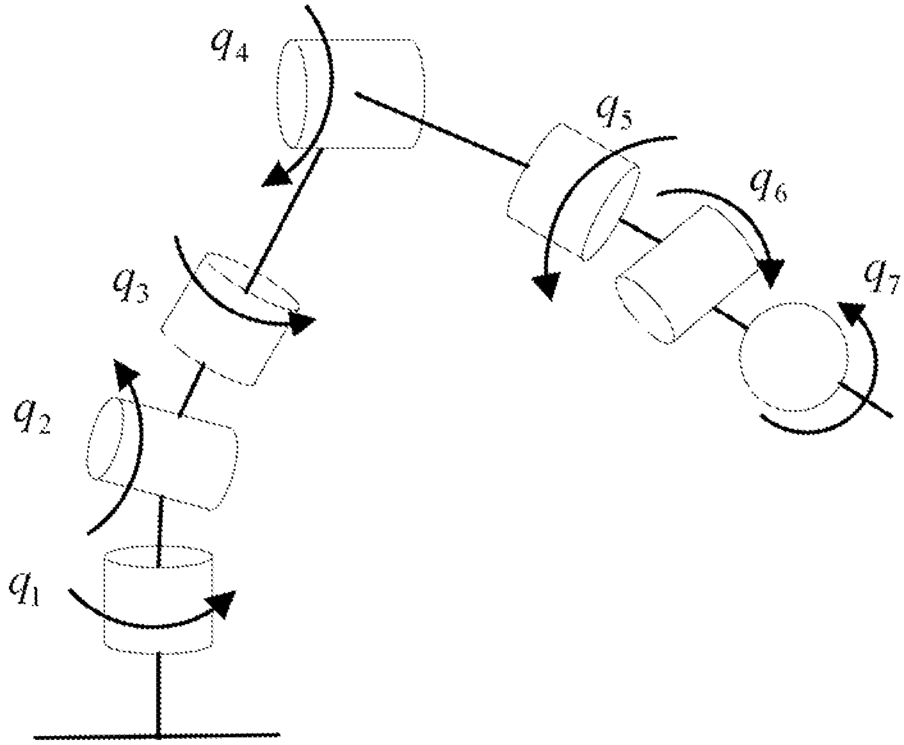
FIG. 2 is a schematic diagram of the structural of a humanoid mechanical arm of a massage robot according to an embodiment of the present disclosure.

FIG. 2 is a schematic diagram of the structural of the humanoid mechanical arm of the massage robot according to an embodiment of the present disclosure. As shown in FIG. 2, in this embodiment, the humanoid robotic arm is a robotic arm with seven degrees of freedom, where each degree of freedom corresponds to one robotic arm joint. Because the humanoid robotic arm may be composed of a robotic arm base, a base joint (the joint $q_1$ in FIG. 2), a shoulder joint (the joint $q_2$ in FIG. 2), an upper arm joint (the joint $q_3$ in FIG. 2), an elbow joint (the joint $q_4$ in FIG. 2)), a forearm joint (the joint $q_5$ in FIG. 2), a wrist joint (the joint $q_6$ in FIG. 2), an arm end joint (the joint $q_7$ in FIG. 2), a plurality of links, and other related components, the motion trajectory of the humanoid robotic arm may be adjusted by adjusting the joint angle of each of the above-mentioned seven joints, so that the robot controller 10 can control the humanoid robotic arm of the massage robot to perform the corresponding massage motion.

In this embodiment, the robot controller 10 may include a storage 11, a processor 2, a communication unit 13, and a massage motion controller 100. The components of the storage 11, the processor 12 and the communication unit 13 are directly or indirectly electrically connected to each other to realize data transmission or interaction. For example, the components of the storage 11, the processor 12 and the communication unit 13 may be electrically connected to each other through one or more communication buses or signal lines.

In this embodiment, the storage 11 may be, but not limited to, a random access memory (RAM), a read only memory (ROM), a programmable read only memory (PROM), erasable programmable read-Only memory (EPROM), electrical erasable programmable read-only memory (EEPROM), or the like. In which, the storage 11 is used for storing computer programs, and the processor 122 can execute the computer programs correspondingly after receiving execution instructions.

In addition, the storage 11 may be further used to store planned massage trajectories of the massage robot for different patients and the massage intensity changes and massage posture changes that are expected to be expressed when the corresponding planned massage trajectory takes effect on the body of the patient, where the planned massage trajectory of a same patient is consisted of the local massage planned trajectories of different massage areas of the same patient. In which, different patients have different physical characteristics (i.e., the three-dimensional characteristics of the skin of different patients are different), different skin areas of the same patient have different curvature changes, and a massage operation requires operations such as performing massages on different body parts and acupoints of the patient, that is, the massage postures corresponding to different massage areas need to be adapted to the (environmental) curvature of the massage area so that the massage motion can effectively fit the surface of the corresponding massage area. At the same time, because different massage areas often require different massage intensities, the area feature points of each massage area of the patient may be obtained through an image collection device, then a local massage planning trajectory for each massage area may be determined according to a preset massage physiotherapy plan, while the massage intensity change and the massage posture change exerted on the body of the patient when each local massage planning trajectory is used may be determined.

In this embodiment, the processor 12 may be an integrated circuit chip with signal processing capability. The processor 12 may be a general purpose processor including at least one of a central processing unit (CPU), a graphics processing unit (GPU), a network processor (NP), a digital signal processor (DSP), an application specific integrated circuit (ASIC), a field-programmable gate array (FPGA) or other programmable logic devices, discrete gate, transistor logic device, and discrete hardware component. The general purpose processor may be a microprocessor or the processor may also be any conventional processor that may implement or execute the methods, steps, and the logical block diagrams disclosed in the embodiments of the present disclosure.

In this embodiment, the communication unit 13 is used for establishing a communication connection between the robot controller 10 and other electronic devices through a network, and for sending/receiving data through the network, where the network includes a wired communication and a wireless communication network. For example, the robot controller 10 may send a massage control instruction to the massage robot through the communication unit 13 so that the massage robot moves according to the massage control instruction to realize the corresponding massage physiotherapy operation.

In this embodiment, the massage motion controller 100 may include at least one software function module that can be stored in the storage 11 or in the operating system of the robot controller 10 in the form of software or firmware. The processor 12 may be used to execute executable modules such as software function modules and computer programs included in the massage motion controller 100 that are stored in the storage 11. The robot controller 10 may control the massage robot through the massage motion controller 100 to realize the adaptive change of the massage position and the massage intensity of the robot for the massage area of the patient, so that the massage motion exerted on the body of the patient can adapt to the massage areas of the patient so as to ensure that the exerted massage motion can effectively fit the surface of the corresponding massage area and effectively achieve the expected massage effect to improve the patient's massage experience.

It can be understood that the composition of the robot controller 10 in FIG. 1 is only an example of that of a robot controller, and the robot controller 10 may further include more or less elements than those shown in FIG. 1, or have a different configuration from that shown in FIG. 1. Each of the elements shown in FIG. 1 may be implemented in hardware, software, or a combination thereof.

In the present disclosure, in order to ensure that the robot controller 10 can make the massage motion exerted on the body of the patient can adapt to the massage areas of the patient so as to ensure that the exerted massage motion can effectively fit the surface of the corresponding massage area and effectively achieve the expected massage effect to improve the patient's massage experience, the massage motion control method for the massage robot is provided. The massage motion control method will be described in detail below.

Figure 3:
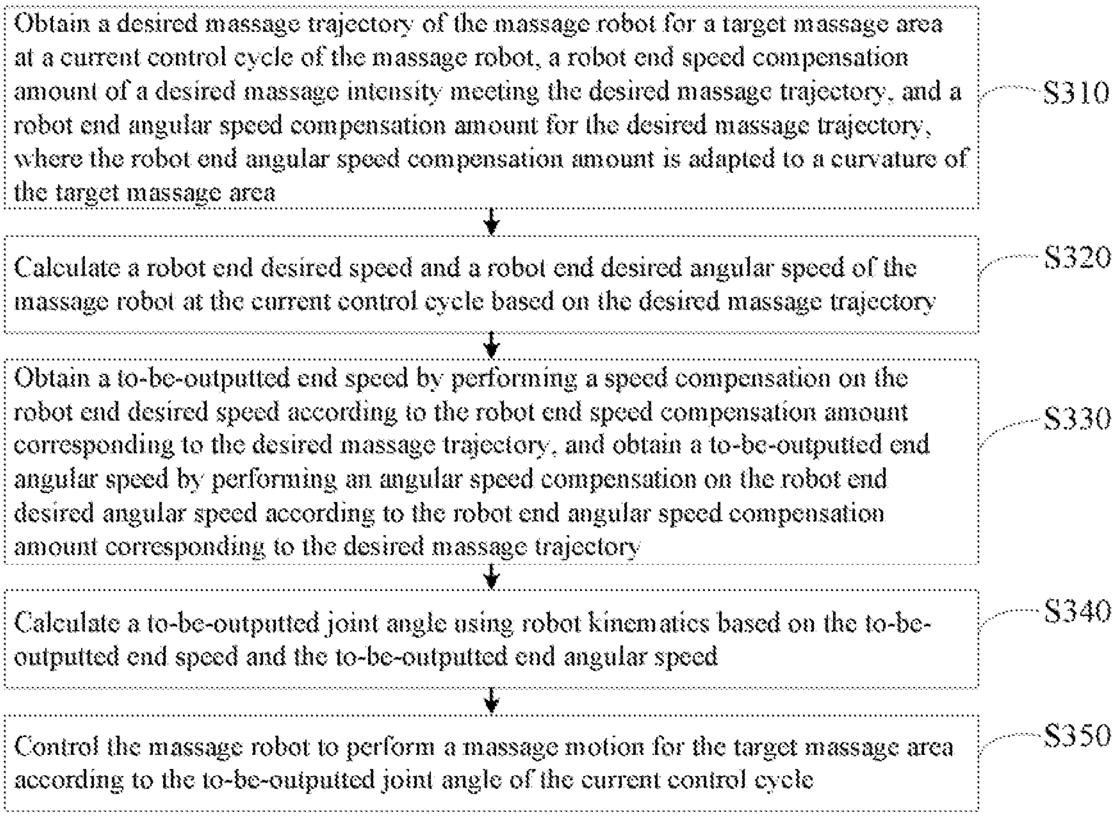
FIG. 3 is a flow chart of a first example of a massage motion control method according to an embodiment of the present disclosure.

FIG. 3 is a flow chart of a first example of the massage motion control method according to an embodiment of the present disclosure. In this embodiment, the massage motion control method is a computer-implemented method executable for a processor of the above-mentioned massage robot. The method may be implemented through the robot controller shown in FIG. 1, the massage robot shown in FIG. 2, or a massage motion control apparatus shown in FIG. 7. As shown in FIG. 3, the method may include steps S310-S350, which adaptively change the massage position and the massage intensity of the robot for the massage area.

S310: obtaining a desired massage trajectory of the massage robot for a target massage area at a current control cycle of the massage robot, a robot end speed compensation amount of a desired massage intensity meeting the desired massage trajectory, and a robot end angular speed compensation amount for the desired massage trajectory, where the robot end angular speed compensation amount is adapted to a curvature of the target massage area.

In this embodiment, the desired massage trajectory is the trajectory of the massage motion that is desired to be exerted to the target massage area when the message robot is in an ideal state (e.g., an end part of the massage robot is in contact with the surface of the target massage area, and the force received by the end part of the massage robot meets the massage intensity requirement). The robot end angular speed compensation amount is used to compensate and adjust the posture of the end part (the end) (e.g., the end effector) of the massage robot, so that the adjusted posture of the end part adapts to the (environmental) curvature of individual skin area on individual human body, so as to ensure that the corresponding massage motion can effectively fit the contour of the human body while additional massage pressure error will not be caused; and the robot end speed compensation amount is used to track and compensate the massage pressure of the end part of the massage robot, so that the end part of the massage robot can exert the desired massage intensity. In addition, the desired massage intensity is used to indicate the massage intensity desired to be exerted on the patient when the massage motion of the corresponding massage trajectory is performed, which can be represented by the expected contact force of the desired generalized force of the massage robot that matches the corresponding massage trajectory, where the contact force may be expressed by the force perpendicular to the direction of a flange of the end part of the massage robot. The condition of the massage posture of the robot between the desired massage trajectory and the (environmental) curvature of the target massage area may be represented by the expected torque (moment) of the desired generalized force of the massage robot that matches with the corresponding massage trajectory. In which, the desired massage trajectory may be the track content in the local massage planning track corresponding to the target massage area at the current control cycle.

Therefore, the robot controller 10 may obtain the desired massage trajectory of the massage robot for the target massage area of the current control cycle, and correspondingly obtain the robot end speed compensation amount and the robot end angular speed compensation corresponding to the desired massage trajectory of the current control cycle, then adjust the desired massage trajectory to a certain extent based on the obtained robot end speed compensation amount and the robot end angular speed compensation amount so as to make the robot controller 10 to perform the matching massage motion according to the adjusted desired output massage trajectory, so that the massage position and the massage intensity of the robot adaptively changes for the target massage area to make the massage motion automatically adapting to the target massage area, thereby ensuring that the massage motion can effectively fit the surface of the corresponding massage area and effectively achieve the expected massage effect so as to improve the patient's massage experience.

S320: calculating a robot end desired speed and a robot end desired angular speed of the massage robot at the current control cycle based on the desired massage trajectory.

In this embodiment, the desired massage trajectory may include a robot end desired position that matches the desired massage intensity, and a robot end posture angle that matches the (environmental) curvature of the target massage area. Therefore, when the robot controller 10 obtains the desired massage trajectory of the massage robot for the target massage area at the current control cycle, the robot controller 10 may obtain the corresponding robot end desired speed and robot end desired angular speed of the robot controller 10 at the current control cycle by performing a time-related differential operation on the desired massage trajectory of the current control cycle. In which the robot end desired speed is the first derivative form of the robot end desired position, and the robot end desired angular speed is the first derivative form of the robot end posture angle.

S330: obtaining a to-be-outputted end speed by performing a speed compensation on the robot end desired speed according to the robot end speed compensation amount corresponding to the desired massage trajectory, and obtaining a to-be-outputted end angular speed by performing an angular speed compensation on the robot end desired angular speed according to the robot end angular speed compensation amount corresponding to the desired massage trajectory.

In this embodiment, the to-be-outputted end speed is used to indicate the robot end speed that the massage robot is expected to show when it meets the corresponding desired massage intensity at the current control cycle so as to ensure that the massage intensity of the massage robot meets the expectation, and the to-be-outputted end angular speed is used to indicate the robot end angular speed that the massage robot is expected to show when it is adapted to the surface curvature of the target massage area at the current control cycle so as to ensure that the massage position of the massage robot meets the expectation, thereby ensuring that the massage position of the massage robot is as expected. The robot controller 10 may achieve the speed compensation operation for the desired massage trajectory by superimposing the robot end speed compensation amount corresponding to the same desired massage trajectory on the corresponding robot end desired speed, and may achieve the angular speed compensation operation for the desired massage trajectory by superimposing the robot end angular speed compensation amount corresponding to the same desired massage trajectory on the corresponding robot end desired angular speed.

S340: calculating a to-be-outputted joint angle using robot kinematics based on the to-be-outputted end speed and the to-be-outputted end angular speed.

In this embodiment, after the robot controller 10 determines the to-be-outputted end speed and the to-be-outputted end angular speed of the massage robot that correspond to the current control cycle, the to-be-outputted joint angle and the Jacobian matrix of the massage robot that are correspond to the to-be-outputted end speed and the to-be-outputted end angular speed may be calculated by using the robot kinematics principle to perform robot kinematics inverse solving and Jacobian mapping based on the to-be-outputted end speed and the to-be-outputted end angular speed, then the to-be-outputted joint angle of the massage robot that corresponds to the to-be-outputted end speed and the to-be-outputted end angular speed may be calculated by performing a time-related integral operation on the calculated to-be-outputted joint angle. In which, the to-be-outputted end angular speed is used to represent a set of values of joint angular speed that each joint of the massage robot is expected to show when achieving the to-be-outputted end speed and the to-be-outputted end angular speed, and the to-be-outputted joint angle is used to represent a set of values of joint angle that each joint of the massage robot is expected to show when achieving the to-be-outputted end speed.

S350: controlling the massage robot to perform a massage motion for the target massage area according to the to-be-outputted joint angle of the current control cycle.

In this embodiment, after the robot controller 10 calculates the to-be-outputted joint angle corresponding to the desired massage trajectory of the current control cycle, it will determine the to-be-outputted joint angle that is expected to show when the robot controller 10 is at the current control cycle, and then the to-be-outputted joint angle will be outputted to a position controller of the massage robot to make the position controller to adjust the joint angle of each joint of the massage robot according to the obtained to-be-outputted joint angle, so that the massage motion performed by the massage robot for the target massage area can be effectively fitted on the skin surface of the target massage area by adapting to the (environmental) curvature of the target massage area and meet the desired massage intensity of the desired massage trajectory of the current control cycle, thereby ensuring that the corresponding massage motion fits the contour of the human body while the desired massage intensity is exerted, which avoids the massage intensity error caused by the massage position error so as to realize the automatic adaptation of the massage position and the massage intensity of the robot for the target massage area, so that the massage motion can be effectively fit to the surface of the corresponding massage area and can effectively achieve the expected massage effect to improve the massage experience of the patient. The massage motion is performed by adjusting a joint angle of joint(s) of the massage robot according to the to-be-outputted joint angle.

Therefore, in the present disclosure, the adaptive change of the massage position and the massage intensity of the massage robot for the target massage area can be realized by performing the above-mentioned steps S310-S350, so that the massage motion of the massage robot can be automatically adapted to the target massage area, thereby ensuring that the corresponding massage motion fits the contour of the human body while the desired massage intensity is exerted, thereby avoiding the massage intensity error caused by the massage position error, so that the massage motion can be effectively fit to the surface of the corresponding massage area and can achieve the expected massage effect to improve the massage experience of the patient.

In some embodiments, in order to ensure that the effect of the robot controller 10 to implement the massage motion control method shown in FIG. 3 can be as expected, it is necessary for the robot controller 10 to determine the robot end speed compensation amount and robot end angular speed compensation amount for achieving the desired massage effect that matches each local massage planning trajectory. In the present disclosure, a compensation amount calculation method for the robot end speed and the robot end angular speed is provided to achieve the foregoing object. The massage motion control method provided by the present disclosure will be further described in detail below.

Figure 4:
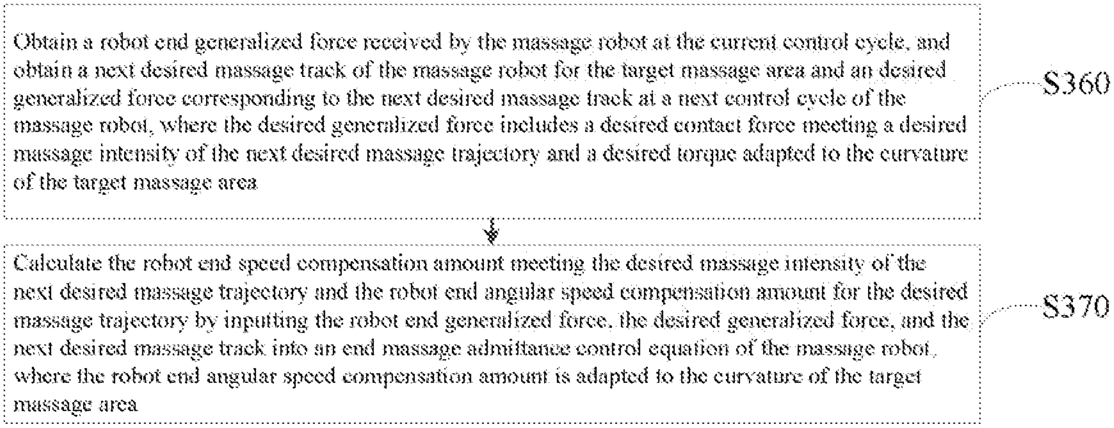
FIG. 4 is a flow chart of a second example of a massage motion control method according to an embodiment of the present disclosure.

FIG. 4 is a flow chart of a second example of the massage motion control method according to an embodiment of the present disclosure. As shown in FIG. 4, in this embodiment, the massage motion control method may include steps S360-S370, which ensure the calculated robot end speed compensation amount and robot end angular speed compensation amount for each local massage planning trajectory of the target massage area to be effective.

S360: obtaining a robot end generalized force received by the massage robot at the current control cycle, and obtaining a next desired massage track of the massage robot for the target massage area and an desired generalized force corresponding to the next desired massage track at a next control cycle of the massage robot, where the desired generalized force includes a desired contact force meeting a desired massage intensity of the next desired massage trajectory and a desired torque adapted to the (environmental) curvature of the target massage area.

In this embodiment, the robot controller 10 may detect, through a force sensor installed at the end part of the massage robot, the force state when the massage robot contacts the target massage area, so as to obtain the robot end generalized force (i.e., the generalized force at an end of the robot) that the massage robot is subjected to. In which, the force sensor may be a six-dimensional force sensor, and the robot end generalized force is actually the real generalized force received at the end part of the massage robot. At this time, the robot end generalized force includes the real contact force and real torque that an end of the massage robot receives at the current control cycle.

The next desired massage track of the next control cycle is used to represent the desired massage trajectory corresponding to a next control cycle that is after the current control cycle. The desired generalized force is used to represent the generalized force expected to be exerted by the massage robot that corresponds to the next desired massage track, and the desired generalized force may configure the expected contact force perpendicular to the direction of the flange of the end part of the massage robot as the expected massage intensity of the next desired massage track while configure the expected torque of the other two force directions perpendicular to the expected contact force to zero, so that the expected torque is adapted to the (environmental) curvature of the target massage area so as to facilitate the subsequent determination for the expected torque difference and the end force difference between the robot end generalized force of the current control cycle and the desired generalized force of the next control cycle. In which, the next desired massage track of the next control cycle includes the robot end desired position corresponding to the desired contact force and the robot end posture angle corresponding to the desired torque.

In one embodiment, in order to ensure that the massage technique of the massage robot achieves a human-like effect, a trigonometric function may be used to design the corresponding change between the expected massage intensity and the massage duration. For example, the corresponding change between the expected massage intensity and the massage duration may be designed as equations of:

$$f_{zd}=\begin{cases} f_{max}\sin(\omega t); & f_{zd}>0 \\ 0; & \text{others} \end{cases};$$

where, $f_{zd}$ represents the real expected massage intensity, $f_{max}$ represents the maximum expected massage intensity of the target massage area, ω is the sine frequency, and t is the massage duration.

S370: calculating the robot end speed compensation amount meeting the desired massage intensity of the next desired massage trajectory and the robot end angular speed compensation amount for the desired massage trajectory by inputting the robot end generalized force, the desired generalized force, and the next desired massage track into an end massage admittance control equation of the massage robot, where the robot end angular speed compensation amount is adapted to the (environmental) curvature of the target massage area.

In this embodiment, the end massage admittance control equation used by the massage robot may be as an equation of:

$$M(\ddot{X}_c(t_0+1)-\ddot{X}_r(t_0+1))+B(\dot{X}_c(t_0+1)-\dot{X}_r(t_0+1))=F(t_0)-F_d(t_0+1);$$

where, M represents an inertia matrix of an expected impedance model of the massage robot for the target massage area, B represents a damping matrix of the massage robot for the target massage area, $X_r(t_0+1)$ represents the next desired massage track of the massage robot for the target massage area at the $t_0$+1 control cycle, the next desired massage track includes a robot end desired position corresponding to the expected contact force at the $t_0$+1 control cycle and a robot end posture angle corresponding to the desired torque at the $t_0$+1 control cycle, $X_c(t_0+1)$ represents an expected output massage trajectory of the massage robot for the target massage area at the $t_0$+1-th control cycle, the expected output massage trajectory includes a robot end expected position corresponding to the robot end speed compensation amount of the $t_0$+1-th control cycle and a robot end expected posture angle corresponding to the robot end angular speed compensation amount of the $t_0$+1-th control cycle, $\dot{X}_r(t_0+1)$ is the first derivative form of $X_r(t_0+1)$ that represent a matrix set of the robot end desired speed and the robot end desired angular speed of the massage robot for the target massage area at the $t_0$+1 control cycle, $\dot{X}_c(t_0+1)$ is the first derivative form of $X_c(t_0+1)$ that represent a matrix set of a desired end output speed and a desired end output angular speed of the massage robot for the target massage area at the $t_0$+1 control cycle, $\ddot{X}_r(t_0+1)$ is the second derivative form of $X_r(t_0+1)$ that represents a matrix set of a robot end desired acceleration and a robot end desired angular acceleration of the massage robot for the target massage area at the $t_0$+1 control cycle, $\ddot{X}_c(t_0+1)$ is the second derivative form of $X_c(t_0+1)$ that represent a matrix set of a desired end output acceleration and the desired end output angular acceleration of the massage robot for the target massage area at the $t_0$+1 control cycle, $F(t_0)$ represents the robot end generalized force that the massage robot receives at the $t_0$-th control cycle, and the robot end generalized force includes a real contact force and a real torque received by an end of the massage robot at the $t_0$-th control cycle, and $F_d(t_0+1)$ represents the desired generalized force of the massage robot that corresponds to the next desired massage track of the $t_0$+1-th control cycle.

In this case, after the robot controller 10 obtains the robot end generalized force of the massage robot of the current control cycle and obtains the next desired massage trajectory and the desired generalized force corresponding to the next desired massage trajectory of the next control cycle, the desired end output speed and the desired end output angular speed corresponding to the expected output massage trajectory of the robot controller 10 in the next control cycle may be calculated by substituting the forgoing three sets of parameters into the above-mentioned end massage admittance control equation, then the robot end speed compensation amount that meets the desired massage intensity of the next desired massage trajectory may be obtained by calculating the speed difference between the desired end output speed and the robot end desired speed corresponding to the next desired massage trajectory (i.e., the desired massage trajectory of the next control cycle) of the robot controller 10 in the next control cycle, and then the robot end angular speed compensation amount that is adapted to the (environmental) curvature of the massage are may be obtained by calculating the angular speed difference between the desired end output angular speed and the robot end desired angular speed corresponding to the next desired massage trajectory (i.e., the desired massage trajectory of the next control cycle) of the robot controller 10 in the next control cycle, thereby eliminating the expected torque error generated when the end effector of the robot and the skin posture of the patient do not coincide through the robot end angular speed compensation amount, so that the massage position of the end effector can fit the skin posture, and the massage intensity performed by the end effector can be effectively regulated through the robot end speed compensation amount, which realizes the automatic adaptation of each of the massage position of the massage motion and the massage intensity with the target massage area.

Therefore, in the present disclosure, by executing S360-S370, the robot end speed compensation amount and robot end acceleration compensation amount for realizing the desired massage effect that are effective for each local massage planning trajectory of the target massage area can be calculated.

In one embodiment, in the present disclosure, in order to ensure the safety of the massage operation when the robot controller 10 implements the massage motion control method shown in FIG. 3 and avoid serious safety accidents, a massage safety maintenance method for a motion robot is provided. The massage safety maintenance method will be described in detail below.

Figure 5:
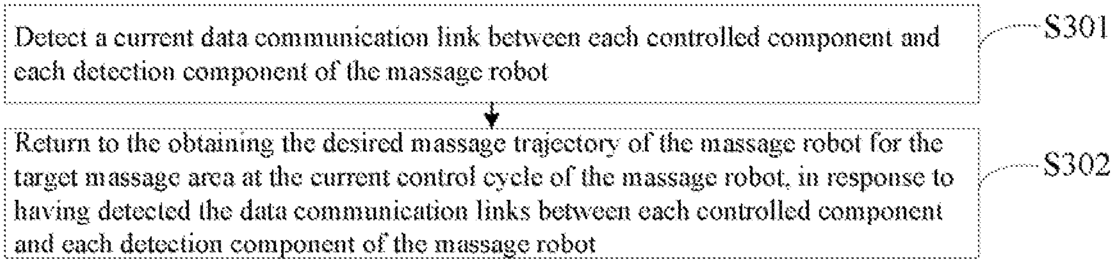
FIG. 5 is a flow chart of a third example of a massage motion control method according to an embodiment of the present disclosure.

FIG. 5 is a flow chart of a third example of the massage motion control method according to an embodiment of the present disclosure. As shown in FIG. 5, in this embodiment, in comparison with the massage motion control method shown in FIG. 3, the massage motion control method shown in FIG. 5 may further include steps S301-S302 that are executed before step S310 so as to ensure the safety of the massage operation of the massage robot and avoid serious safety accidents.

S301: detecting a current data communication link between each controlled component and each detection component of the massage robot.

In this embodiment, the controlled components of the massage robot may include components such as a joint motor and a joint link of the massage robot, and the detection components of the massage robot may include a sole force sensor of the massage robot and a force sensor and a camera of the end effector. The robot controller 10 may create a data communication link with each controlled component and each detection component included in the massage robot, so that the robot controller 10 can detect and control the motion state of the massage robot. As an example, there may be an information processing center installed at the massage robot, so that the information processing center can communicate with each controlled component and each detection component included in the massage robot, and then the current data communication link with each controlled component and each detection component included in the massage robot may be constructed by establishing the data communication link between the robot controller 10 and the information processing center installed at the massage robot.

The robot controller 10 may configure a matching callback function for each data communication link to be constructed, and then monitor the creation status of each data communication link by calling the callback function. In which, the callback function records byte contents for representing whether the corresponding data communication link is created, and whether the corresponding data communication link is created or not may be determined by analyzing the changes of the bytes in the callback function.

S302: returning to the obtaining the desired massage trajectory of the massage robot for the target massage area at the current control cycle of the massage robot (i.e., step S310), in response to having detected the data communication links between each controlled component and each detection component of the massage robot.

In this embodiment, if it is detected that the number of the currently created data communication links with each controlled component and each detection component included in the massage robot does not reach an expected number of links, it indicates that the communication status between the robot controller 10 and the massage robot is extremely poor. If insisting using the robot controller 10 to control the massage robot to perform massage operations on the patient, a safety hazard will easily occur. At this time, the robot controller 10 will not correspondingly perform the massage motion control method shown in FIG. 3 so as to ensure a safe massage experience of the patient.

Otherwise, if it is detected that the number of the currently created data communication links with each controlled component and each detection component included in the massage robot reaches the expected number of links, it indicates that the communication status between the robot controller 10 and the massage robot are connected is good, and the robot controller 10 can control the massage robot to perform massage operations on the patient. At this time, the robot controller 10 will correspondingly perform the massage motion control method shown in FIG. 3, that is, go to step S310 in the massage motion control method shown in FIG. 3 for continuing the execution of the method.

Therefore, in the present disclosure, by executing S301-S302, the probability of safety hazards can be reduced so as to ensure a safe massage experience of the patient.

Figure 6:
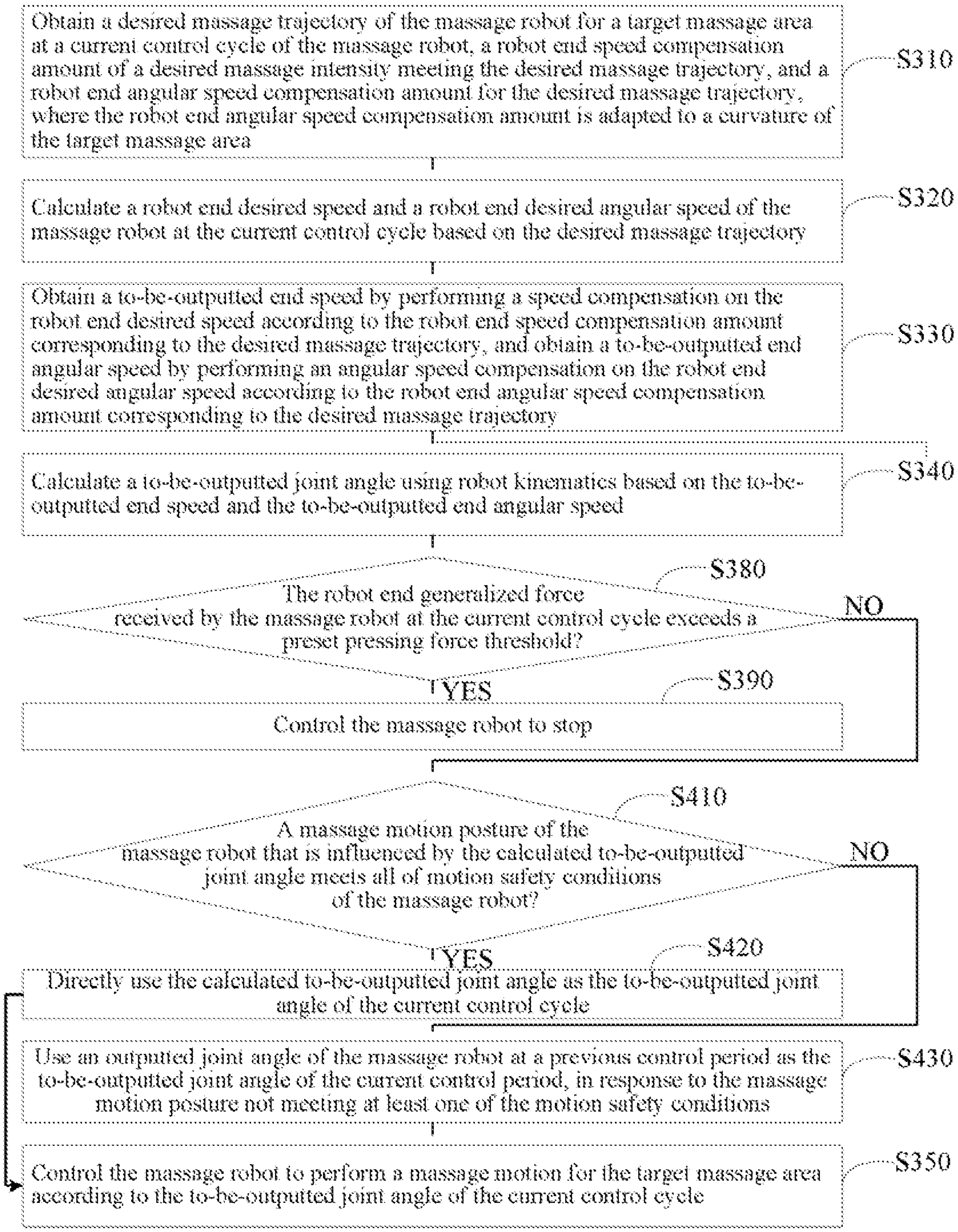
FIG. 6 is a flow chart of a fourth example of a massage motion control method according to an embodiment of the present disclosure.

FIG. 6 is a flow chart of a fourth example of the massage motion control method according to an embodiment of the present disclosure. As shown in FIG. 6, in this embodiment, in comparison with the massage motion control method shown in FIG. 3, the massage motion control method shown in FIG. 6 may further include steps S380-S430 that are executed before step S350 so as to ensure the safety of the massage operation of the massage robot and avoid serious safety accidents.

S380: detecting whether the robot end generalized force received by the massage robot at the current control cycle exceeds a preset pressing force threshold.

In this embodiment, the robot controller 10 determines whether the robot end generalized force at the current control cycle will cause harm to the body of the patient or not by comparing the robot end generalized force received by the massage robot in the current control cycle with the preset pressing force threshold. If the robot end generalized force received by the massage robot in the current control cycle exceeds the preset pressing force threshold, it means that the robot end generalized force corresponding to the massage robot is likely to cause harm to the body of the patient, and at this time, step S390 will be executed correspondingly; otherwise, it means that the massage robot can continue to perform the massage operation, and at this time, step S410 will be executed correspondingly.

S390: controlling the massage robot to stop.

In this embodiment, if it is detected that the robot end generalized force exceeds the preset pressing force threshold, the massage robot may be controlled to stop so as to avoid the massage robot from causing harm to the body of the patient and avoid serious safety accidents.

S410: determining whether a massage motion posture of the massage robot that is influenced by the calculated to-be-outputted joint angle meets all of a plurality of motion safety conditions of the massage robot.

In this embodiment, if it is detected that the robot end generalized force does not exceed the preset pressing force threshold, it means that the massage robot can continue to perform the massage operation. At this time, the corresponding massage motion posture when the massage robot operates according to the calculated to-be-outputted joint angle may be determined based on the calculated to-be-outputted joint angle for the current control cycle, and whether the determined massage motion posture meets a plurality of motion safety conditions of the massage robot simultaneously may be determined accordingly, and then the to-be-outputted joint angle that should be used in the current control cycle may be determined according to the determination result so as to ensure the safety of the massage operation of the massage robot and avoid serious safety accidents. In which, if it is determined that the massage motion posture of the massage robot that is influenced by of the calculated to-be-outputted joint angle simultaneously meet the plurality of motion safety conditions of the massage robot, it means that the calculated to-be-outputted joint angle will not threaten the safety of the massage operation of the massage robot, and at this time, step S420 may be executed accordingly; if it is determined that the massage motion posture of the massage robot that is influenced by of the calculated to-be-outputted joint angle does not meet at least one of the plurality of motion safety conditions of the massage robot, it means that the calculated to-be-outputted joint angle will threaten the safety of the massage operation of the massage robot, and at this time, step S430 may be executed accordingly.

During this process, the plurality of motion safety conditions of the massage robot may include:

- a joint angle difference between the to-be-outputted joint angle calculated at the current control period and the outputted joint angle of the massage robot at the previous control cycle being less than a jump joint angle threshold;
- the calculated to-be-outputted joint angle calculated at the current control period being less than a limit joint angle threshold;

an operability index corresponding to the to-be-outputted joint angle calculated at the current control period being greater than a preset index threshold, where the operability index is calculated based on a Jacobian matrix corresponding to the calculated to-be-outputted joint angle; and a robot end position of the massage robot that is influenced by the calculated to-be-outputted joint angle not exceeding a preset end massage boundary of the massage robot.

In which, the outputted joint angle of the massage robot corresponding to the previous control cycle is used to represent the to-be-outputted joint angle actually used when the massage robot performs the massage motion in a control cycle before the current control cycle. The jump joint angle threshold is used to represent the minimum joint angle change amplitude when the to-be-outputted joint angle that is actually used in the adjacent control cycle has jumping, where the jump Joint angle threshold may be composed of a jump angle threshold corresponding to each robot joint in the massage robot. The limit joint angle threshold is used to represent the limitation of each robot joint in the massage robot, where the limit joint angle threshold may be composed of a limit angle threshold corresponding to each robot joint in the massage robot. The preset end massage boundary is used to represent the farthest position of the motion position of the robot end for the target massage area. The operability index corresponding to the to-be-outputted joint angle calculated in the current control cycle may be calculated using an equation of:

$$W=\sqrt{\det(J\cdot J^{T})};$$

where, W is the operability index, det is the matrix determinant operator, and J and $J^T$ are respectively the Jacobian matrix and its transpose corresponding to the to-be-outputted joint angle calculated its the current control cycle.

S420: directly using the calculated to-be-outputted joint angle as the to-be-outputted joint angle of the current control cycle In this embodiment, if it is determined that the massage motion posture of the massage robot that is influenced by the calculated to-be-outputted joint angle meets the plurality of motion safety conditions of the massage robot simultaneously, it means that the calculated to-be-outputted joint angle will not threaten the safety of the massage operation of the massage robot. At this time, the to-be-outputted joint angle calculated in the current control cycle may be directly used as the to-be-outputted joint angle that is actually used in the current control cycle, and then the robot controller 10 may control the massage robot to execute the above-mentioned step S350.

S430: using an outputted joint angle of the massage robot at a previous control period as the to-be-outputted joint angle of the current control period, in response to the massage motion posture not meeting at least one of the motion safety conditions.

In this embodiment, if it is determined that the massage motion posture of the massage robot that is influenced by the calculated to-be-outputted joint angle does not meet at least one of the plurality of motion safety conditions, it means that the calculated to-be-outputted joint angle will threaten the safety of the massage operation of the massage robot. At this time, the calculated to-be-outputted joint angle cannot be used for performing massage motions, and the outputted joint angle of the massage robot that corresponds to the previous control cycle should be directly used as the to-be-outputted joint angle of the current control cycle. In this manner, it can be ensured that the massage robot maintains the final massage motion result of the previous control cycle unchanged in the current control cycle, and then the robot controller 10 may control the massage robot to perform the above-mentioned step S350.

Therefore, in the present disclosure, based on the massage motion control method shown in FIG. 3, the safety of the massage operation of the massage robot can be ensured by executing the above-mentioned steps S380-S430, so as to avoid serious safety accidents.

In the present disclosure, in order to ensure that the robot controller 10 can execute the above-mentioned massage motion control method through a massage motion control apparatus 100, the foregoing functions is implemented by performing functional module divisions on the massage motion control apparatus 100. The components of the massage motion control apparatus 100 provided by the present disclosure will be described below accordingly.

Figure 7:
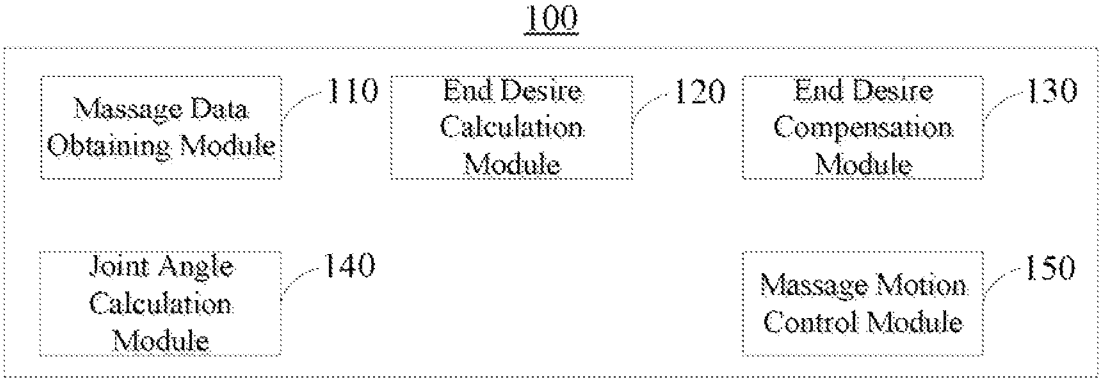
FIG. 7 is a schematic block diagram of the composition of a first example of a massage motion control apparatus according to an embodiment of the present disclosure.

FIG. 7 is a schematic block diagram of the composition of a first example of the massage motion control apparatus 100 according to an embodiment of the present disclosure. As shown in FIG. 7, in this embodiment, the massage motion control apparatus 100 for a massage robot is provided. The massage motion control apparatus 100 may include a massage data obtaining module 110, an end desire calculation module 120, an end desire compensation module 130, a joint angle calculation module 140, and a massage motion control module 150.

The massage data obtaining module 110 is configured to obtain a desired massage trajectory of the massage robot for a target massage area, a robot end speed compensation amount of a desired massage intensity meeting the desired massage trajectory, and a robot end angular speed compensation amount for the desired massage trajectory, for a current control cycle of the massage robot, where the robot end angular speed compensation amount is adapted to a curvature of the target massage area.

The end desire calculation module 120 is configured to calculate a robot end desired speed and a robot end desired angular speed of the massage robot for the current control cycle based on the desired massage trajectory.

The end desire compensation module 130 is configured to obtain a to-be-outputted end speed by performing a speed compensation on the robot end desired speed according to the robot end speed compensation amount corresponding to the desired massage trajectory, and obtain a to-be-outputted end angular speed by performing an angular speed compensation on the robot end desired angular speed according to the robot end angular speed compensation amount corresponding to the desired massage trajectory.

The joint angle calculation module 140 is configured to calculate a to-be-outputted joint angle using robot kinematics based on the to-be-outputted end speed and the to-be-outputted end angular speed.

The massage motion control module 150 is configured to control the massage robot to perform a massage motion for the target massage area according to the to-be-outputted joint angle of the current control cycle.

Figure 8:
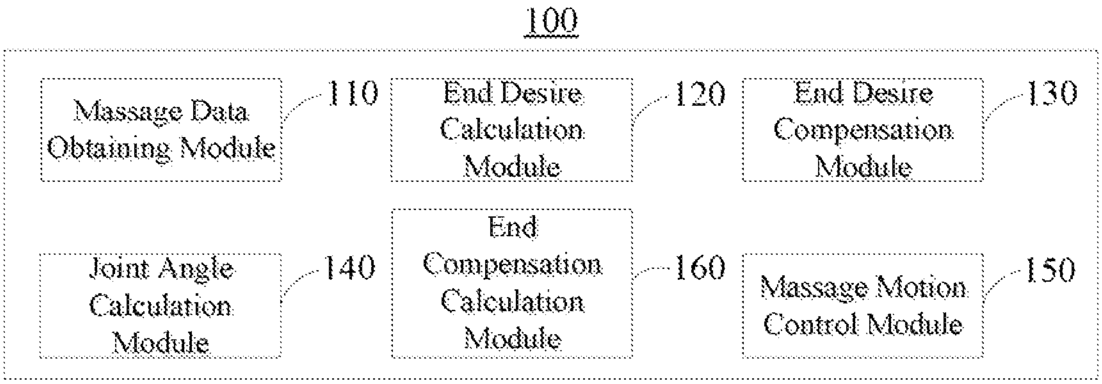
FIG. 8 is a schematic block diagram of the composition of a second example of a massage motion control apparatus according to an embodiment of the present disclosure.

FIG. 8 is a schematic block diagram of the composition of a second example of the massage motion control apparatus 100 according to an embodiment of the present disclosure. As shown in FIG. 8, in this embodiment, the massage motion control apparatus 100 may further include an end compensation calculation module 160.

The massage data obtaining module 110 is further configured to obtain a robot end generalized force received by the massage robot at the current control cycle, and obtain a next desired massage track of the massage robot for the target massage area and an desired generalized force corresponding to the next desired massage track at a next control cycle of the massage robot, where the desired generalized force includes a desired contact force meeting a desired massage intensity of the next desired massage trajectory and a desired torque adapted to the curvature of the target massage area.

The end compensation calculation module 160 is configured to calculate the robot end speed compensation amount meeting the desired massage intensity of the next desired massage trajectory and the robot end angular speed compensation amount for the desired massage trajectory by inputting the robot end generalized force, the desired generalized force, and the next desired massage track into an end massage admittance control equation of the massage robot, where the robot end angular speed compensation amount is adapted to the curvature of the target massage area.

In which, the end massage admittance control equation is:

$$M(\ddot{X}_c(t_0+1)-\ddot{X}_r(t_0+1))+B(\dot{X}_c(t_0+1)-\dot{X}_r(t_0+1))=F(t_0)-F_d(t_0+1);$$

where, M represents an inertia matrix of an expected impedance model of the massage robot for the target massage area, B represents a damping matrix of the massage robot for the target massage area, $X_r(t_0+1)$ represents the next desired massage track of the massage robot for the target massage area at the $t_0+1$ control cycle, the next desired massage track includes a robot end desired position corresponding to the expected contact force at the $t_0+1$ control cycle and a robot end posture angle corresponding to the desired torque at the $t_0+1$ control cycle, $X_c(t_0+1)$ represents an expected output massage trajectory of the massage robot for the target massage area at the $t_0+1$-th control cycle, the expected output massage trajectory includes a robot end expected position corresponding to the robot end speed compensation amount of the $t_0+1$-th control cycle and a robot end expected posture angle corresponding to the robot end angular speed compensation amount of the $t_0+1$-th control cycle, $F(t_0)$ represents the robot end generalized force that the massage robot receives at $t_0$-th control cycle, and the robot end generalized force includes a real contact force and a real torque received by an end of the massage robot at the $t_0$-th control cycle, and $F_d(t_0+1)$ represents the desired generalized force corresponding to the next desired massage track of the $t_0+1$-th control cycle.

Figure 9:
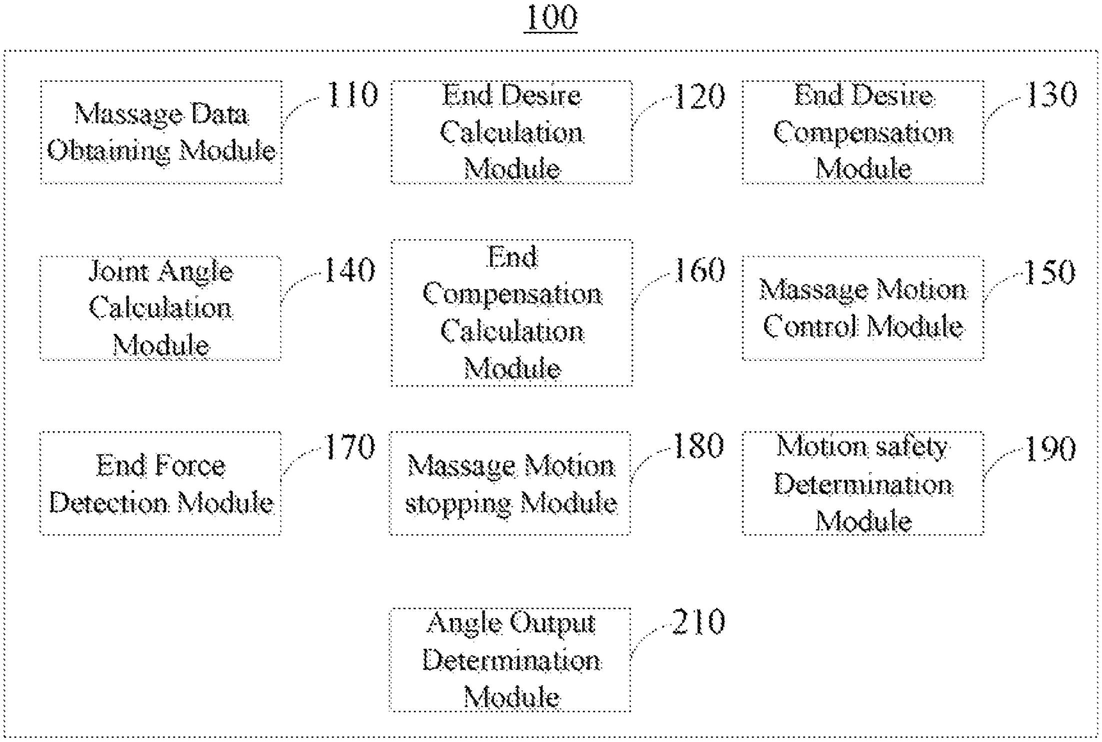
FIG. 9 is a schematic block diagram of the composition of a third example of a massage motion control apparatus according to an embodiment of the present disclosure.

FIG. 9 is a schematic block diagram of the composition of a third example of the massage motion control apparatus 100 according to an embodiment of the present disclosure. As shown in FIG. 9, in this embodiment, the massage motion control apparatus 100 may further include an end force detection module 170, a massage motion stopping, module 180, a motion safety determination module 190, and an angle output determination module 210.

The end force detection module 170 is configured to detect whether the robot end generalized force received by the massage robot at the current control cycle exceeds a preset pressing force threshold.

The massage motion stopping module 180 is configured to control the massage robot to stop, in response to the robot end generalized force exceeding the preset pressing force threshold.

The motion safety determination module 190 is configured to determine whether a massage motion posture of the massage robot that is influenced by the calculated to-be-outputted joint angle meets all of a plurality of motion safety conditions of the massage robot, in response to the robot end generalized force not exceeding the preset pressing force threshold.

The angle output determination module 210 is configured to directly using the calculated to-be-outputted joint angle as the to-be-outputted joint angle of the current control cycle, in response to the massage motion posture meeting all of the motion safety conditions at the same time.

The angle output determination module 210 is further configured to use an outputted joint angle of the massage robot at a previous control period as the to-be-outputted joint angle of the current control period, in response to the massage motion posture not meeting at least one of the motion safety conditions.

In which, the plurality of motion safety conditions of the massage robot may include:

- a joint angle difference between the calculated to-be-outputted joint angle and the outputted joint angle being less than a jump joint angle threshold;
- the calculated to-be-outputted joint angle being less than a limit joint angle threshold;
- an operability index corresponding to the calculated to-be-outputted joint angle being greater than a preset index threshold, where the operability index is calculated based on a Jacobian matrix corresponding to the calculated to-be-outputted joint angle; and
- a robot end position of the massage robot that is influenced by the calculated to-be-outputted joint angle not exceeding a preset end massage boundary of the massage robot.

Figure 10:
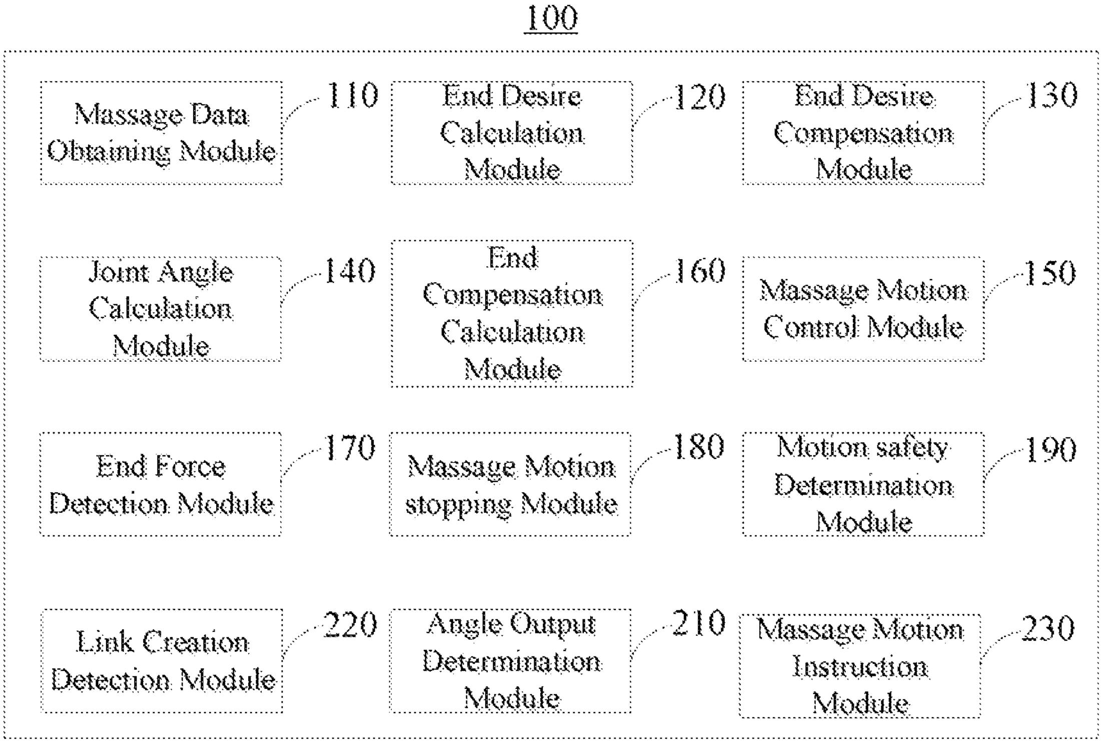
FIG. 10 is a schematic block diagram of the composition of a fourth example of a massage motion control apparatus according to an embodiment of the present disclosure.

FIG. 10 is a schematic block diagram of the composition of a fourth example of the massage motion control apparatus 100 according to an embodiment of the present disclosure. As shown in FIG. 10, in this embodiment, the massage motion control apparatus 100 may further include a link creation detection module 220 and a massage motion instruction module 230.

The link creation detection module 220 is configured to detect a current data communication link between each controlled component and each detection component of the massage robot.

The massage motion instruction module 230 is configured to return to the obtaining the desired massage trajectory of the massage robot for the target massage area at the current control cycle of the massage robot, in response to having detected the data communication links between each controlled component and each detection component of the massage robot.

It should be noted that, the massage motion controller 100 provided by this embodiment has the same basic principles and ethnical effects as the above-mentioned massage motion control method. For a brief description, for parts not mentioned in this embodiment, reference may be made to the forgoing description of the massage motion control method.

In the embodiments provided in the present disclosure, it should be understood that the disclosed apparatus (device) and method may also be implemented in other manners. The device embodiments described above are merely illustrative, for example, the flowcharts and block diagrams in the drawings illustrate the architecture, functionality and operation that are possible to be implemented according to the apparatus, methods and computer program products of the embodiments of the present disclosure. In this regard, each block in the flowchart or block diagram may represent a module, program segment, or a part of codes that contains one or more executable instructions for implementing the specified logical function(s). It should also be noted that, in some alternative implementations, the functions denoted in the block may occur out of the order noted in the figures. For example, two blocks in succession may, in fact, be executed substantially concurrently, or the blocks may sometimes be executed in the reverse order, depending upon the functionality involved. It should also be noted that each block in the block diagrams and/or flowchart and combinations of the blocks in the block diagrams and/or flowchart may be implemented in a dedicated hardware-based system that perform the specified functions or actions, or be implemented in a combination of dedicated hardware and computer instructions.

In addition, each functional module in each embodiment of the present disclosure may be integrated together to form an independent part, or each module may exist independently, or two or more modules may be integrated to form an independent part. If the function(s) are implemented in the form of software functional modules and sold or used as independent products, they may be stored in a readable storage medium. Based on this understanding, the essential parts of the technical solution of the present disclosure or the parts that contribute to the prior art, or a part of the technical solution may be embodied in the form of software products. The computer software product is stored in a computer readable storage medium including a certain number of instructions to cause a computer device (e.g., a personal computer, a server, and a network device) to execute all or part of the steps of the methods described in each embodiment of the present disclosure. The above-mentioned computer readable storage medium may include a USB disk, a mobile hard disk, a read-only memory (ROM), a random access memory (RAM), a magnetic disk, and an optical disk which is capable of storing program codes.

To sum up, in the massage motion control method, the robot controller, and the computer readable storage medium provided by the present disclosure, by calculating the robot end desired speed and the robot end desired angular speed corresponding to the desired massage trajectory at the current control cycle accordingly in the case that the desired massage trajectory of the massage robot for the target massage area at the current control cycle, the robot end speed compensation amount meeting the desired massage intensity of the desired massage trajectory, and the robot end angular speed compensation amount for the desired massage trajectory that is adapted to the (environmental) curvature of the target massage area are obtained; compensating the robot end desired speed and the robot end desired angular speed corresponding to the desired massage trajectory according to the obtained robot end speed compensation amount and robot end angular speed compensation amount, respectively to obtain the to-be-outputted end speed and the to-be-outputted end angular speed; calculating the to-be-outputted joint angle using robot kinematics based on the to-be-outputted end speed and the to-be-outputted end angular speed; and controlling the massage robot to perform the massage motion for the target massage area according to the to-be-outputted joint angle of the current control cycle, the adaptive change of the massage position and the massage intensity of the robot for the massage area of the patient can be realized, so that the massage motion exerted on the body of the patient can adapt to the massage areas of the patient and achieve the expected massage effect so as to improve the patient's massage experience.

The forgoing are only various embodiments of the present disclosure, and the protection scope of the present disclosure is not limited thereto. Any change or substitution that can be easily thought of by those skilled in the art within the technical scope disclosed in the present disclosure shall be covered within the protection scope of protection of the present disclosure. Therefore, the protection scope of the present disclosure shall be subject to the protection scope of the claims.

What is claimed is:

1. A computer-implemented massage motion control method for a massage robot, comprising:

obtaining a desired massage trajectory of the massage robot for a target massage area at a current control cycle of the massage robot, a robot end speed compensation amount of a desired massage intensity meeting the desired massage trajectory, and a robot end angular speed compensation amount for the desired massage trajectory, wherein the robot end angular speed compensation amount is adapted to a curvature of the target massage area;

calculating a robot end desired speed and a robot end desired angular speed of the massage robot at the current control cycle based on the desired massage trajectory;

obtaining a to-be-outputted end speed by performing a speed compensation on the robot end desired speed according to the robot end speed compensation amount corresponding to the desired massage trajectory, and obtaining a to-be-outputted end angular speed by performing an angular speed compensation on the robot end desired angular speed according to the robot end angular speed compensation amount corresponding to the desired massage trajectory;

calculating a to-be-outputted joint angle using robot kinematics based on the to-be-outputted end speed and the to-be-outputted end angular speed; and controlling the massage robot to perform a massage motion for the target massage area by adjusting a joint angle of one or more joints of the massage robot according to the to-be-outputted joint angle.

2. The method of claim 1, further comprising:

obtaining a robot end generalized force received by the massage robot at the current control cycle, and obtaining a next desired massage track of the massage robot for the target massage area and a desired generalized force corresponding to the next desired massage track at a next control cycle of the massage robot, wherein the desired generalized force includes a desired contact force meeting a desired massage intensity of the next desired massage track and a desired torque adapted to the curvature of the target massage area; and calculating the robot end speed compensation amount meeting the desired massage intensity of the next desired massage track and the robot end angular speed compensation amount for the desired massage trajectory by inputting the robot end generalized force, the desired generalized force, and the next desired massage track into an end massage admittance control equation of the massage robot, wherein the robot end angular speed compensation amount is adapted to the curvature of the target massage area.

3. The method of claim 2, wherein the end massage admittance control equation is:

$$M(\ddot{X}_c(t_0+1)-\ddot{X}_r(t_0+1))+B(\dot{X}_c(t_0+1)-\dot{X}_r(t_0+1)=F(t_0)-F_d(t_0+1);$$

where, M represents an inertia matrix of an expected impedance model of the massage robot for the target massage area, B represents a damping matrix of the massage robot for the target massage area, $X_r(t_0+1)$ represents the next desired massage track of the massage robot for the target massage area at the $t_0+1$ control cycle, the next desired massage track includes a robot end desired position corresponding to the expected contact force at the $t_0+1$ control cycle and a robot end posture angle corresponding to the desired torque at the $t_0+1$ control cycle, $X_c(t_0+1)$ represents an expected output massage trajectory of the massage robot for the target massage area at the $t_0+1$-th control cycle, the expected output massage trajectory includes a robot end expected position corresponding to the robot end speed compensation amount of the $t_0+1$-th control cycle and a robot end expected posture angle corresponding to the robot end angular speed compensation amount of the $t_0+1$-th control cycle, $F(t_0)$ represents the robot end generalized force that the massage robot receives at the $t_0$-th control cycle, and the robot end generalized force includes a real contact force and a real torque received by an end of the massage robot at the $t_0$-th control cycle, and $F_d(t_0+1)$ represents the desired generalized force corresponding to the next desired massage track of the $t_0+1$-th control cycle.

4. The method of claim 2, wherein before the controlling the massage robot to perform the massage motion for the target massage area by adjusting the joint angle of the one or more joints of the massage robot according to the to-be-outputted joint angle, the method further comprises:

detecting whether the robot end generalized force received by the massage robot at the current control cycle exceeds a preset pressing force threshold;

controlling the massage robot to stop, in response to the robot end generalized force exceeding the preset pressing force threshold;

determining whether a massage motion posture of the massage robot that is influenced by the calculated to-be-outputted joint angle meets all of a plurality of motion safety conditions of the massage robot, in response to the robot end generalized force not exceeding the preset pressing force threshold; and using an outputted joint angle of the massage robot at a previous control period as the to-be-outputted joint angle of the current control period, in response to the massage motion posture not meeting at least one of the motion safety conditions.

5. The method of claim 4, wherein the motion safety conditions comprise:

a joint angle difference between the calculated to-be-outputted joint angle and the outputted joint angle being less than a jump joint angle threshold;

the calculated to-be-outputted joint angle being less than a limit joint angle threshold;

an operability index corresponding to the calculated to-be-outputted joint angle being greater than a preset index threshold, wherein the operability index is calculated based on a Jacobian matrix corresponding to the calculated to-be-outputted joint angle; and a robot end position of the massage robot that is influenced by the calculated to-be-outputted joint angle not exceeding a preset end massage boundary of the massage robot.

6. The method of claim 1, wherein before the obtaining the desired massage trajectory of the massage robot for the target massage area at the current control cycle of the massage robot, the method further comprises:

detecting at least one data communication link between at least one controlled component and at least one detection component of the massage robot; and returning to the obtaining the desired massage trajectory of the massage robot for the target massage area at the current control cycle of the massage robot, in response to the at least one data communication link being detected.

7. The method of claim 1, wherein the desired massage trajectory includes a robot end desired position matching the desired massage intensity and a robot end posture angle matching the curvature of the target massage area.

8. A robot controller, comprising:

a processor;

a memory coupled to the processor; and one or more computer programs stored in the memory and executable on the processor;

wherein, the one or more computer programs comprise:

instructions for obtaining a desired massage trajectory of a massage robot for a target massage area at a current control cycle of the massage robot, a robot end speed compensation amount of a desired massage intensity meeting the desired massage trajectory, and a robot end angular speed compensation amount for the desired massage trajectory, wherein the robot end angular speed compensation amount is adapted to a curvature of the target massage area;

instructions for calculating a robot end desired speed and a robot end desired angular speed of the massage robot at the current control cycle based on the desired massage trajectory;

instructions for obtaining a to-be-outputted end speed by performing a speed compensation on the robot end desired speed according to the robot end speed compensation amount corresponding to the desired massage trajectory, and obtaining a to-be-outputted end angular speed by performing an angular speed compensation on the robot end desired angular speed according to the robot end angular speed compensation amount corresponding to the desired massage trajectory;

instructions for calculating a to-be-outputted joint angle using robot kinematics based on the to-be-outputted end speed and the to-be-outputted end angular speed; and instructions for controlling the massage robot to perform a massage motion for the target massage area by adjusting a joint angle of one or more joints of the massage robot according to the to-be-outputted joint angle.

9. The robot controller of claim 8, the one or more computer programs further comprise:

instructions for obtaining a robot end generalized force received by the massage robot at the current control cycle, and obtaining a next desired massage track of the massage robot for the target massage area and a desired generalized force corresponding to the next desired massage track at a next control cycle of the massage robot, wherein the desired generalized force includes a desired contact force meeting a desired massage intensity of the next desired massage track and a desired torque adapted to the curvature of the target massage area; and instructions for calculating the robot end speed compensation amount meeting the desired massage intensity of the next desired massage track and the robot end angular speed compensation amount for the desired massage trajectory by inputting the robot end generalized force, the desired generalized force, and the next desired massage track into an end massage admittance control equation of the massage robot, wherein the robot end angular speed compensation amount is adapted to the curvature of the target massage area.

10. The robot controller of claim 9, wherein the end massage admittance control equation is:

$$M(\ddot{X}_c(t_0+1)-\ddot{X}_r(t_0+1)+B(\dot{X}_c(t_0+1)-\dot{X}_r(t_0+1)=F(t_0)-F_d(t_0+1);$$

where, M represents an inertia matrix of an expected impedance model of the massage robot for the target massage area, B represents a damping matrix of the massage robot for the target massage area, $X_r(t_0+1)$ represents the next desired massage track of the massage robot for the target massage area at the $t_0+1$ control cycle, the next desired massage track includes a robot end desired position corresponding to the expected contact force at the $t_0+1$ control cycle and a robot end posture angle corresponding to the desired torque at the $t_0+1$ control cycle, $X_c(t_0+1)$ represents an expected output massage trajectory of the massage robot for the target massage area at the $t_0+1$-th control cycle, the expected output massage trajectory includes a robot end expected position corresponding to the robot end speed compensation amount of the $t_0+1$-th control cycle and a robot end expected posture angle corresponding to the robot end angular speed compensation amount of the $t_0+1$-th control cycle, $F(t_0)$ represents the robot end generalized force that the massage robot receives at the $t_0$-th control cycle, and the robot end generalized force includes a real contact force and a real torque received by an end of the massage robot at the $t_0$-th control cycle, and $F_d(t_0+1)$ represents the desired generalized force corresponding to the next desired massage track of the $t_0+1$-th control cycle.

11. The robot controller of claim 9, wherein the one or more computer programs further comprise:

instructions for detecting whether the robot end generalized force received by the massage robot at the current control cycle exceeds a preset pressing force threshold;

instructions for controlling the massage robot to stop, in response to the robot end generalized force exceeding the preset pressing force threshold;

instructions for determining whether a massage motion posture of the massage robot that is influenced by the calculated to-be-outputted joint angle meets all of a plurality of motion safety conditions of the massage robot, in response to the robot end generalized force not exceeding the preset pressing force threshold; and instructions for using an outputted joint angle of the massage robot at a previous control period as the to-be-outputted joint angle of the current control period, in response to the massage motion posture not meeting at least one of the motion safety conditions.

12. The robot controller of claim 11, wherein the motion safety conditions comprise:

a joint angle difference between the calculated to-be-outputted joint angle and the outputted joint angle being less than a jump joint angle threshold;

the calculated to-be-outputted joint angle being less than a limit joint angle threshold;

an operability index corresponding to the calculated to-be-outputted joint angle being greater than a preset index threshold, wherein the operability index is calculated based on a Jacobian matrix corresponding to the calculated to-be-outputted joint angle; and a robot end position of the massage robot that is influenced by the calculated to-be-outputted joint angle not exceeding a preset end massage boundary of the massage robot.

13. The robot controller of claim 8, wherein the one or more computer programs further comprise:

instructions for detecting at least one data communication link between at least one controlled component and at least one detection component of the massage robot; and instructions for returning to the obtaining the desired massage trajectory of the massage robot for the target massage area at the current control cycle of the massage robot, in response to the at least one data communication link being detected.

14. The robot controller of claim 8, wherein the desired massage trajectory includes a robot end desired position matching the desired massage intensity and a robot end posture angle matching the curvature of the target massage area.

15. A non-transitory computer readable storage medium for storing one or more computer programs, wherein the one or more computer programs comprise:

instructions for obtaining a desired massage trajectory of a massage robot for a target massage area at a current control cycle of the massage robot, a robot end speed compensation amount of a desired massage intensity meeting the desired massage trajectory, and a robot end angular speed compensation amount for the desired massage trajectory, wherein the robot end angular speed compensation amount is adapted to a curvature of the target massage area;

instructions for calculating a robot end desired speed and a robot end desired angular speed of the massage robot at the current control cycle based on the desired massage trajectory;

instructions for obtaining a to-be-outputted end speed by performing a speed compensation on the robot end desired speed according to the robot end speed compensation amount corresponding to the desired massage trajectory, and obtaining a to-be-outputted end angular speed by performing an angular speed compensation on the robot end desired angular speed according to the robot end angular speed compensation amount corresponding to the desired massage trajectory;

instructions for calculating a to-be-outputted joint angle using robot kinematics based on the to-be-outputted end speed and the to-be-outputted end angular speed; and instructions for controlling the massage robot to perform a massage motion for the target massage area by adjusting a joint angle of one or more joints of the massage robot according to the to-be-outputted joint angle.

16. The storage medium of claim 15, the one or more computer programs further comprise:

instructions for obtaining a robot end generalized force received by the massage robot at the current control cycle, and obtaining a next desired massage track of the massage robot for the target massage area and a desired generalized force corresponding to the next desired massage track at a next control cycle of the massage robot, wherein the desired generalized force includes a desired contact force meeting a desired massage intensity of the next desired massage track and a desired torque adapted to the curvature of the target massage area; and instructions for calculating the robot end speed compensation amount meeting the desired massage intensity of the next desired massage track and the robot end angular speed compensation amount for the desired massage trajectory by inputting the robot end generalized force, the desired generalized force, and the next desired massage track into an end massage admittance control equation of the massage robot, wherein the robot end angular speed compensation amount is adapted to the curvature of the target massage area.

17. The storage medium controller of claim 16, wherein the end massage admittance control equation is:

$$M(\ddot{X}_c(t_0+1)-\hat{X}_r(t_0+1)+B(\dot{X}_c(t_0+1)-\dot{X}_r(t_0+1)=F(t_0)-F_d(t_0+1);$$

where, M represents an inertia matrix of an expected impedance model of the massage robot for the target massage area, B represents a damping matrix of the massage robot for the target massage area, $X_r(t_0+1)$ represents the next desired massage track of the massage robot for the target massage area at the $t_0+1$ control cycle, the next desired massage track includes a robot end desired position corresponding to the expected contact force at the $t_0+1$ control cycle and a robot end posture angle corresponding to the desired torque at the $t_0+1$ control cycle, $X_c(t_0+1)$ represents an expected output massage trajectory of the massage robot for the target massage area at the $t_0+1$-th control cycle, the expected output massage trajectory includes a robot end expected position corresponding to the robot end speed compensation amount of the $t_0+1$-th control cycle and a robot end expected posture angle corresponding to the robot end angular speed compensation amount of the $t_0+1$-th control cycle, $F(t_0)$ represents the robot end generalized force that the massage robot receives at the $t_0$-th control cycle, and the robot end generalized force includes a real contact force and a real torque received by an end of the massage robot at the $t_0$-th control cycle, and $F_d(t_0+1)$ represents the desired generalized force corresponding to the next desired massage track of the $t_0+1$-th control cycle.

18. The storage medium of claim 16, wherein the one or more computer programs further comprise:

instructions for detecting whether the robot end generalized force received by the massage robot at the current control cycle exceeds a preset pressing force threshold;

instructions for controlling the massage robot to stop, in response to the robot end generalized force exceeding the preset pressing force threshold;

instructions for determining whether a massage motion posture of the massage robot that is influenced by the calculated to-be-outputted joint angle meets all of a plurality of motion safety conditions of the massage robot, in response to the robot end generalized force not exceeding the preset pressing force threshold; and instructions for using an outputted joint angle of the massage robot at a previous control period as the to-be-outputted joint angle of the current control period, in response to the massage motion posture not meeting at least one of the motion safety conditions.

19. The storage medium of claim 18, wherein the motion safety conditions comprise:

a joint angle difference between the calculated to-be-outputted joint angle and the outputted joint angle being less than a jump joint angle threshold;

the calculated to-be-outputted joint angle being less than a limit joint angle threshold;

an operability index corresponding to the calculated to-be-outputted joint angle being greater than a preset index threshold, wherein the operability index is calculated based on a Jacobian matrix corresponding to the calculated to-be-outputted joint angle; and a robot end position of the massage robot that is influenced by the calculated to-be-outputted joint angle not exceeding a preset end massage boundary of the massage robot.

20. The storage medium of claim 15, wherein the one or more computer programs further comprise:

instructions for detecting at least one data communication link between at least one controlled component and at least one detection component of the massage robot; and instructions for returning to the obtaining the desired massage trajectory of the massage robot for the target massage area at the current control cycle of the massage robot, in response to the at least one data communication link being detected.

* * * * *